(12) United States Patent
Haque et al.

(10) Patent No.: US 12,321,683 B1
(45) Date of Patent: Jun. 3, 2025

(54) COMPUTING TECHNOLOGIES FOR WEB FORMS

(71) Applicant: Munich American Reassurance Company, Atlanta, GA (US)

(72) Inventors: Adnan Haque, Atlanta, GA (US); Magd Bayoumi, Atlanta, GA (US)

(73) Assignee: Munich American Reassurance Company, Atlanta, GA (US)

(*) Notice: Subject to any disclaimer, the term of this patent is extended or adjusted under 35 U.S.C. 154(b) by 0 days.

(21) Appl. No.: 18/798,331

(22) Filed: Aug. 8, 2024

Related U.S. Application Data

(62) Division of application No. 18/524,439, filed on Nov. 30, 2023, now Pat. No. 12,067,343.

(51) Int. Cl.
*G06F 17/00* (2019.01)
*G06F 40/103* (2020.01)
*G06F 40/284* (2020.01)

(52) U.S. Cl.
CPC .......... *G06F 40/103* (2020.01); *G06F 40/284* (2020.01)

(58) Field of Classification Search
CPC .............................. G06F 40/103; G06F 40/284
See application file for complete search history.

(56) References Cited

U.S. PATENT DOCUMENTS

| | | | |
|---|---|---|---|
| 7,716,322 B2 * | 5/2010 | Benedikt | G06F 16/951 715/224 |
| 10,460,392 B1 | 10/2019 | Etheridge | |
| 10,635,748 B2 | 4/2020 | Liu | |
| 11,005,964 B1 * | 5/2021 | Ledet | H04L 67/563 |
| 11,113,770 B1 | 9/2021 | Magoon | |
| 11,132,209 B2 | 9/2021 | Capt | |
| 11,553,053 B2 | 1/2023 | Singh | |
| 11,610,137 B1 | 3/2023 | Buhler | |
| 11,727,189 B1 | 8/2023 | Denison | |
| 12,019,983 B1 * | 6/2024 | Kong | G06F 16/367 |
| 2003/0233260 A1 | 12/2003 | Snell | |
| 2012/0232955 A1 * | 9/2012 | Riazzi | G06Q 30/0204 705/7.32 |
| 2014/0074550 A1 | 3/2014 | Chourey | |
| 2014/0173405 A1 | 6/2014 | Ferrara | |

(Continued)

FOREIGN PATENT DOCUMENTS

| | | |
|---|---|---|
| CN | 113610375 A | 11/2021 |
| CN | 115760438 A | 3/2023 |

(Continued)

OTHER PUBLICATIONS

Eiamboonsert, Pawarate, et al, dCollective: A Configurable Electronic Data Collection Form and Information Dashboard, 2018 15th International Conference on Computer Science and Software Engineering (JCSSE), pp. 1-6 (Year: 2018).

(Continued)

*Primary Examiner* — Laurie A Ries
(74) *Attorney, Agent, or Firm* — Dentons US LLP

(57) ABSTRACT

This disclosure improves computer functionality by enabling various web forms, whether dynamic or static. For example, some of such web forms may enable a responsive user experience. For example, some of such web form may enable an efficient computing architecture. For example, some of such web forms may enable a freeform text to be analyzed in substance.

21 Claims, 9 Drawing Sheets

(56) References Cited

U.S. PATENT DOCUMENTS

| | | |
|---|---|---|
| 2014/0189676 A1 | 7/2014 | Mahajan |
| 2016/0335065 A1 | 11/2016 | Omori |
| 2016/0335316 A1* | 11/2016 | Riva ................. G06F 16/24575 |
| 2017/0109341 A1* | 4/2017 | Issa .......................... G06F 16/21 |
| 2017/0329842 A1* | 11/2017 | Ng Tari .............. G06F 3/04842 |
| 2018/0060302 A1* | 3/2018 | Liang ...................... G06F 16/35 |
| 2018/0173698 A1* | 6/2018 | Dubey ................. G06F 16/3347 |
| 2018/0232443 A1* | 8/2018 | Delgo ...................... G06F 16/35 |
| 2019/0005138 A1* | 1/2019 | Andreica ............ G10L 15/1815 |
| 2019/0012381 A1* | 1/2019 | Debique ............. G06F 16/9535 |
| 2019/0087748 A1 | 3/2019 | Adams |
| 2019/0138543 A1* | 5/2019 | Matesso ............ G06F 16/24578 |
| 2019/0354625 A1* | 11/2019 | Toudji ................... G06F 16/248 |
| 2019/0378428 A1 | 12/2019 | Nevarez |
| 2020/0104876 A1 | 4/2020 | Chintakindi |
| 2021/0004691 A1* | 1/2021 | Neumann ............... G06N 5/041 |
| 2021/0117621 A1* | 4/2021 | Sharpe .................... G06F 16/35 |
| 2021/0209138 A1 | 7/2021 | Sureshkumar |
| 2022/0188974 A1* | 6/2022 | Mysore .................. G06N 5/025 |
| 2022/0198572 A1* | 6/2022 | Aggarwal ............... G06N 20/00 |
| 2022/0318564 A1 | 10/2022 | Juravicius |
| 2023/0017196 A1 | 1/2023 | Jain |
| 2023/0342426 A1 | 10/2023 | Kramer |
| 2023/0394236 A1* | 12/2023 | Kaveti .................... G06F 40/30 |
| 2024/0071375 A1* | 2/2024 | Singh ..................... G06F 40/20 |

FOREIGN PATENT DOCUMENTS

| | | | |
|---|---|---|---|
| CN | 116628301 A * | 8/2023 | |
| WO | WO2002037387 A2 | 5/2002 | |
| WO | WO2013074001 A2 | 5/2013 | |
| WO | WO-2014141300 A2 * | 9/2014 | ....... G06F 16/24575 |
| WO | WO2018/150244 | 8/2018 | |
| WO | WO2019113550 A1 | 6/2019 | |
| WO | WO2022087497 A1 | 4/2022 | |

OTHER PUBLICATIONS

International Search Report and Written Opinion dated Nov. 25, 2024 in related application PCT/US2024/041462 filed Aug. 8, 2024 (13 pages).

Wang, Assisting End-Users in Filling Out Web Services, Queen's University, Canada, May 2016 (47 pages).

* cited by examiner

FIG. 2A

DYNAMICALLY SELECT A SET OF IDENTIFIERS ONE-BY-ONE FOR A SET OF THIRD PARTY DATA SOURCES STORING A SET OF THIRD PARTY DATA COLLECTIONS BASED ON DYNAMICALLY EVALUATING THE SET OF INPUTS ONE-BY-ONE FOR RELEVANCE, WHEREIN EACH THIRD PARTY DATA COLLECTION IN THE SET OF THIRD PARTY DATA COLLECTIONS INCLUDES A SET OF THIRD PARTY DATA POINTS ASSOCIATED WITH THE USER PROFILE, WHEREIN THE SET OF THIRD PARTY DATA SOURCES IS DIFFERENT FROM EACH OTHER IN DATA ORGANIZATION AND LATENCY, WHEREIN THE SET OF THIRD PARTY DATA COLLECTIONS ARE DIFFERENT FROM EACH OTHER IN CONTENT AND FORMAT 212

DYNAMICALLY SUBMIT A SET OF REQUESTS TO THE SET OF THIRD PARTY DATA SOURCES FOR THE SET OF THIRD PARTY DATA COLLECTIONS ONE-BY-ONE BASED ON THE SET OF IDENTIFIERS
214

DYNAMICALLY RECEIVING THE SET OF THIRD PARTY DATA COLLECTIONS ONE-BY-ONE FROM THE SET OF THIRD PARTY DATA SOURCES AND A SET OF DECRYPTION CERTIFICATES, WHEREIN THE SET OF THIRD PARTY DATA COLLECTIONS ARE ENCRYPTED TO BE DECRYPTED BY THE SET OF DECRYPTION CERTIFICATES ON-DEMAND
216

GENERATE A RESPONSE TO THE DYNAMIC WEB FORM ASSOCIATED WITH THE USER PROFILE BASED ON THE SET OF INPUTS AND PERFORM A HOLISTIC ANALYSIS OF THE SET OF THIRD PARTY DATA COLLECTIONS, WHEREIN THE HOLISTIC ANALYSIS INCLUDES ONTOLOGICALLY IDENTIFYING A SUBSET OF DATA POINTS FROM THE SET OF DATA POINTS FOR EACH THIRD PARTY DATA COLLECTION IN THE SET OF THIRD PARTY DATA COLLECTIONS, FORMING A SET OF COPIES OF THE SUBSETS OF DATA POINTS, SUBMITTING THE SET OF COPIES INTO (I) A DECISION MODEL EXTERNAL TO THE SOFTWARE ENGINE, SUCH THAT THE DECISION MODEL GENERATES A FIRST DECISION, (II) A RULE LOGIC EXTERNAL TO THE SOFTWARE ENGINE, SUCH THAT THE RULE MODEL GENERATES A SECOND DECISION INDEPENDENT OF THE FIRST DECISION, AND (III) A SET OF LOGIC, SUCH THAT THE SET OF LOGIC GENERATES THE RESPONSE BASED ON THE FIRST DECISION AND THE SECOND DECISION, WHEREIN THE RESPONSE RELATES TO THE USER PROFILE
218

SUBMIT THE RESPONSE TO THE SECOND SERVER, SUCH THAT THE SECOND SERVER SERVES THE RESPONSE TO THE APPLICATION PROGRAM FOR CONSUMPTION BY THE USER PROFILE RESPONSIVE TO THE SECOND SERVER BEING PROMPTED BY THE APPLICATION PROGRAM
220

FIG. 2C

COMPUTING TECHNOLOGIES FOR WEB FORMS

CROSS-REFERENCE TO RELATED PATENT APPLICATION

This patent application is a divisional of U.S. patent application Ser. No. 18/524,439 filed 30 Nov. 2023; which is incorporated by reference herein for all purposes.

TECHNICAL FIELD

This disclosure relates to computing technologies for web forms.

BACKGROUND

Conventionally, a person operates a browser application program running on a computing terminal (e.g., a desktop computer, a laptop computer) for accessing a web server to receive a dynamic web form (e.g., a content to render a web page) programmed to present a set of text strings (e.g., a set of labels) and a set of input elements (e.g., a radio button, a dropdown list) that are designed to elicit a set of inputs from the person. As such, the person reads the set of strings and then operates the application program to provide the set of inputs via the set of input elements, thereby completing the dynamic web form. In response, the web server receives the set of inputs from the computing terminal and sends the set of inputs to an application server, which in-turn requests a set of third-party servers for a set of data collections relating to the set of inputs. Then, the application server receives the set of data collections from the set of third-party servers, processes the set of data collections according to a set of rules, and forms a content for the person based on the set of rules. Then, the application server notifies the web server of the content, which in-turn notifies the browser application program of the content, whether via the dynamic web form or another web page. Although this modality of serving the dynamic web form is useful in some use cases, there are still various technological problems.

First, because the application server requests the set of third-party servers to serve the set of data collections after the application server receives the set of inputs from the computing terminal, there is no analysis performed by the application server on the set of inputs, while the dynamic web form is presented on the application program, to determine whether all or less than all data collections in the set of data collections are actually needed to analyze the set of inputs. Therefore, the dynamic web form (i) is not sufficiently responsive when the dynamic web form is presented on the application program, because the person has to wait to complete the dynamic web form before the set of data collections is requested and (ii) wastes a computing resource (e.g., a computational cycle, a memory resource, a network bandwidth) when less than all data collections of the set of data collections are actually needed to analyze the set of inputs.

Second, the dynamic web form is not programmed to analyze a freeform text (e.g., an unstructured text, a descriptive text) in linguistic substance to determine what an input should be for the dynamic web form to be dynamic. This may be so, because analyzing the freeform text in linguistic substance on the browser application program is resource intensive (e.g., a computational cycle, a memory resource), which may make the dynamic web form less responsive or unstable when presented on the browser application program, freeze the browser application program, or crash the browser application program. This state of being becomes even more technologically problematic when the freeform text contains a linguistically nuanced content (e.g., a semantic nuance when a term may have at least two meanings).

SUMMARY

This disclosure at least partially solves at least some technological problems mentioned above. In particular, this disclosure improves computer functionality by enabling various web forms, whether dynamic or static. For example, some of such web forms may enable a more responsive user experience relative to above, because at least some inputs into the web form are being evaluated one-by-one, rather than waiting for the web form that is completed. For example, some of such web form may enable a more efficient computing architecture relative to above, because only those data sources that are satisfy certain thresholds are queried. For example, some of such web forms may enable a freeform text to be analyzed in linguistic substance, with minimum resources used.

There may be a system, comprising: a first server running a software engine programmed to: receive an instruction from a second server responsive to the second server being prompted by an application program running on a computing terminal operated by a user profile; generate a dynamic web form responsive to the instruction, wherein the dynamic web form includes a set of text strings and a set of input elements; submit the dynamic web form to the second server responsive to the instruction, such that the second server serves the dynamic web form to the computing terminal and the set of text strings and the set of inputs elements are dynamically presented one-by-one on the application program; while the set of text strings and the set of inputs elements are dynamically presented one-by-one on the application program: (i) dynamically receive a set of inputs one-by-one from the second server, wherein the set of inputs is dynamically input by the user profile via the set of input elements one-by-one as dynamically presented on the application program and dynamically submitted from the computing terminal to the second server; (ii) dynamically select a set of identifiers one-by-one for a set of third party data sources storing a set of third party data collections based on dynamically evaluating the set of inputs one-by-one for relevance, wherein each third party data collection in the set of third party data collections includes a set of third party data points associated with the user profile, wherein the set of third party data sources is different from each other in data organization and latency, wherein the set of third party data collections are different from each other in content and format; (iii) dynamically submit a set of requests to the set of third party data sources for the set of third party data collections one-by-one based on the set of identifiers; (iv) dynamically receiving the set of third party data collections one-by-one from the set of third party data sources and a set of decryption certificates, wherein the set of third party data collections are encrypted to be decrypted by the set of decryption certificates on-demand; (v) generate a response to the dynamic web form associated with the user profile based on the set of inputs and a holistic analysis of the set of third party data collections, wherein the holistic analysis includes ontologically identifying a subset of data points from the set of data points for each third party data collection in the set of third party data collections, forming a set of copies of the subsets of data points, submitting the set of copies into (i) a decision model external to the software engine, such that the decision model generates a first decision, (ii) a rule model external to the software engine, such that the rule model generates a second decision independent of the first decision, and (iii) a set of logic, such that the set of logic generates the response based on the first decision and the second decision, wherein the response relates to the user profile; and (vi) submit the response to the second server, such that the second server serves the response to the application program for consumption by the user profile responsive to the second server being prompted by the application program.

There may be a method, comprising: enabling a first server running a software engine programmed to: receive an instruction from a second server responsive to the second server being prompted by an application program running on a computing terminal operated by a user profile; generate a dynamic web form responsive to the instruction, wherein the dynamic web form includes a set of text strings and a set of input elements; submit the dynamic web form to the second server responsive to the instruction, such that the second server serves the dynamic web form to the computing terminal and the set of text strings and the set of inputs elements are dynamically presented one-by-one on the application program; while the set of text strings and the set of inputs elements are dynamically presented one-by-one on the application program: (i) dynamically receive a set of inputs one-by-one from the second server, wherein the set of inputs is dynamically input by the user profile via the set of input elements one-by-one as dynamically presented on the application program and dynamically submitted from the computing terminal to the second server; (ii) dynamically select a set of identifiers one-by-one for a set of third party data sources storing a set of third party data collections based on dynamically evaluating the set of inputs one-by-one for relevance, wherein each third party data collection in the set of third party data collections includes a set of third party data points associated with the user profile, wherein the set of third party data sources is different from each other in data organization and latency, wherein the set of third party data collections are different from each other in content and format; (iii) dynamically submit a set of requests to the set of third party data sources for the set of third party data collections one-by-one based on the set of identifiers; (iv) dynamically receiving the set of third party data collections one-by-one from the set of third party data sources and a set of decryption certificates, wherein the set of third party data collections are encrypted to be decrypted by the set of decryption certificates on-demand; (v) generate a response to the dynamic web form associated with the user profile based on the set of inputs and a holistic analysis of the set of third party data collections, wherein the holistic analysis includes ontologically identifying a subset of data points from the set of data points for each third party data collection in the set of third party data collections, forming a set of copies of the subsets of data points, submitting the set of copies into (i) a decision model external to the software engine, such that the decision model generates a first decision, (ii) a rule model external to the software engine, such that the rule model generates a second decision independent of the first decision, and (iii) a set of logic, such that the set of logic generates the response based on the first decision and the second decision, wherein the response relates to the user profile; and (vi) submit the response to the second server, such that the second server serves the response to the application program for consumption by the user profile responsive to the second server being prompted by the application program.

There may be a storage medium storing a set of instructions executable by a processing unit thereby enabling the processing unit to at least partially perform a method, comprising: enabling a first server running a software engine programmed to: receive an instruction from a second server responsive to the second server being prompted by an application program running on a computing terminal operated by a user profile; generate a dynamic web form responsive to the instruction, wherein the dynamic web form includes a set of text strings and a set of input elements; submit the dynamic web form to the second server responsive to the instruction, such that the second server serves the dynamic web form to the computing terminal and the set of text strings and the set of inputs elements are dynamically presented one-by-one on the application program; while the set of text strings and the set of inputs elements are dynamically presented one-by-one on the application program: (i) dynamically receive a set of inputs one-by-one from the second server, wherein the set of inputs is dynamically input by the user profile via the set of input elements one-by-one as dynamically presented on the application program and dynamically submitted from the computing terminal to the second server; (ii) dynamically select a set of identifiers one-by-one for a set of third party data sources storing a set of third party data collections based on dynamically evaluating the set of inputs one-by-one for relevance, wherein each third party data collection in the set of third party data collections includes a set of third party data points associated with the user profile, wherein the set of third party data sources is different from each other in data organization and latency, wherein the set of third party data collections are different from each other in content and format; (iii) dynamically submit a set of requests to the set of third party data sources for the set of third party data collections one-by-one based on the set of identifiers; (iv) dynamically receiving the set of third party data collections one-by-one from the set of third party data sources and a set of decryption certificates, wherein the set of third party data collections are encrypted to be decrypted by the set of decryption certificates on-demand; (v) generate a response to the dynamic web form associated with the user profile based on the set of inputs and a holistic analysis of the set of third party data collections, wherein the holistic analysis includes ontologically identifying a subset of data points from the set of data points for each third party data collection in the set of third party data collections, forming a set of copies of the subsets of data points, submitting the set of copies into (i) a decision model external to the software engine, such that the decision model generates a first decision, (ii) a rule model external to the software engine, such that the rule model generates a second decision independent of the first decision, and (iii) a set of logic, such that the set of logic generates the response based on the first decision and the second decision, wherein the response relates to the user profile; and (vi) submit the response to the second server, such that the second server serves the response to the application program for consumption by the user profile responsive to the second server being prompted by the application program.

There may be a system, comprising: a first server programmed to: receive a set of inputs into a web form as input from a user profile operating an application program running on a computing terminal, wherein the set of inputs includes a freeform text; submit the set of inputs to a second server, such that the second server: tokenizes the freeform text into a set of tokens; forms a set of entities from the set of tokens; detects a negation in the set of entities, wherein the negation negates a presence or relevance of an entity in the set of entities; removes the negation from the set of entities; attempt to match the set of entities to a set of entries in an ontology segmented by a set of codes after the negation has been removed; take a first action relating to the user profile based on the set of entities matching to the set of entries; and take a second action relating to the user profile based on the set of entities not matching to the set of entries.

There may be a method, comprising: enabling a first server programmed to: receive a set of inputs into a web form as input from a user profile operating an application program running on a computing terminal, wherein the set of inputs includes a freeform text; submit the set of inputs to a second server, such that the second server: tokenizes the freeform text into a set of tokens; forms a set of entities from the set of tokens; detects a negation in the set of entities, wherein the negation negates a presence or relevance of an entity in the set of entities; removes the negation from the set of entities; attempt to match the set of entities to a set of entries in an ontology segmented by a set of codes after the negation has been removed; take a first action relating to the user profile based on the set of entities matching to the set of entries; and take a second action relating to the user profile based on the set of entities not matching to the set of entries.

There may be a storage medium storing a set of instructions executable by a processing unit thereby enabling the processing unit to at least partially perform a method, comprising: enabling a first server programmed to: receive a set of inputs into a web form as input from a user profile operating an application program running on a computing terminal, wherein the set of inputs includes a freeform text; submit the set of inputs to a second server, such that the second server: tokenizes the freeform text into a set of tokens; forms a set of entities from the set of tokens; detects a negation in the set of entities, wherein the negation negates a presence or relevance of an entity in the set of entities; removes the negation from the set of entities; attempt to match the set of entities to a set of entries in an ontology segmented by a set of codes after the negation has been removed; take a first action relating to the user profile based on the set of entities matching to the set of entries; and take a second action relating to the user profile based on the set of entities not matching to the set of entries.

DESCRIPTION OF DRAWINGS

FIGS. 2A-2C shows a flowchart of an embodiment of a process of dynamically generating a web form according to this disclosure.

DETAILED DESCRIPTION

Figure 1:
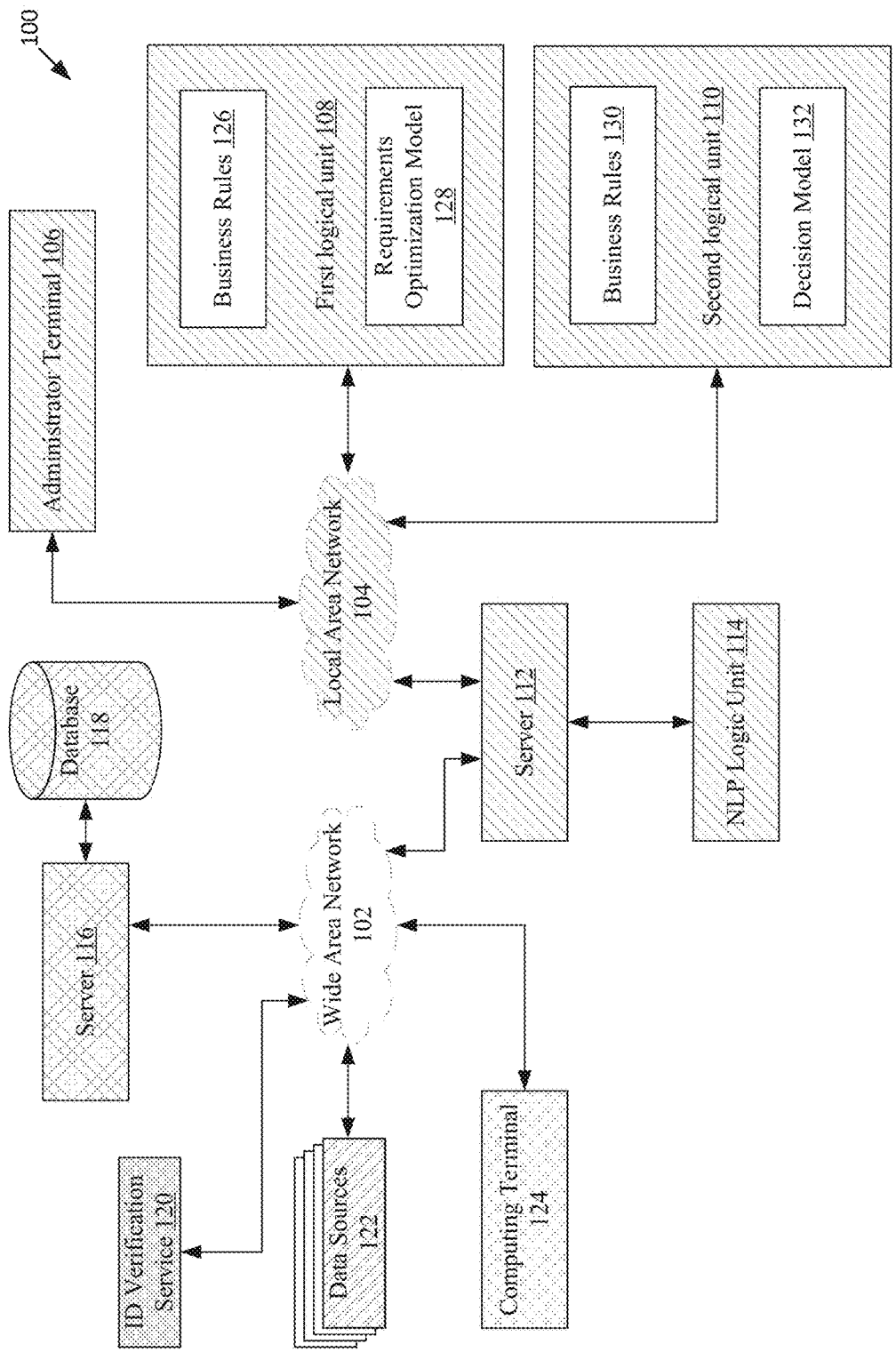
FIG. 1 shows a diagram of an embodiment of an architecture according to this disclosure.

As explained above, this disclosure improves computer functionality by enabling various web forms, whether dynamic or static. For example, some of such web forms may enable a more responsive user experience relative to above, because at least some inputs into the web form are being evaluated one-by-one, rather than waiting for the web form that is completed. For example, some of such web form may enable a more efficient computing architecture relative to above, because only those data sources that are satisfy certain thresholds are queried. For example, some of such web forms may enable a freeform text to be analyzed in linguistic substance, with minimum resources used. This disclosure is now described more fully with reference to all attached figures, in which some embodiments of this disclosure are shown. This disclosure may, however, be embodied in many different forms and should not be construed as necessarily being limited to various embodiments disclosed herein. Rather, these embodiments are provided so that this disclosure is thorough and complete, and fully conveys various concepts of this disclosure to skilled artisans. Note that like numbers or similar numbering schemes can refer to like or similar elements throughout.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Various singular forms "a," "an" and "the" are intended to include various plural forms (e.g., two, three, four, five, six, seven, eight, nine, ten, tens, hundreds, thousands) as well, unless specific context clearly indicates otherwise.

Various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "or others," "combination", "combinatory," or "combinations thereof" or another conceptually similar terminology refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise contextually apparent.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense, unless expressly so defined herein.

Relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Although the terms first, second, can be used herein to describe various elements, components, regions, layers, or sections, these elements, components, regions, layers, or sections should not necessarily be limited by such terms. These terms are used to distinguish one element, component, region, layer or section from another element, component, region, layer, or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can be formed from a same, structurally continuous piece, such as being unitary or monolithic, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three-dimensional (3D) printing, laser cutting, computer numerical control routing, milling, pressing, stamping, vacuum forming, hydroforming, injection molding, lithography, chiseling, cutting, and so forth.

Hereby, all issued patents, published patent applications, and non-patent publications that are mentioned or referred to in this specification are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a diagram of an embodiment of an architecture according to this disclosure. In particular, there is an architecture 100 containing a local area network (LAN) 102, a wide area network (WAN) 104, an administrator terminal 106, a first logical unit 108, a second logical unit 110, a server 112, a natural language processing (NLP) logic unit 114, a server 116, a database 118, an identification (ID) verification service 120, a set of data sources 122, and a computing terminal 124. The first logical unit 108 hosts a set of business rules 126 and a requirements optimization model 128. The second logical unit 110 hosts a set of business rules 130 and a decision model 132.

The WAN 102 may be embodied as a network, a set of networks, or another suitable networking form factor. The WAN 102 may be embodied as Internet. Some, many, most, or all of the components of the hardware architecture 100 are configured to communicate using the WAN 102 to enable various computing algorithms, as disclosed herein.

The LAN 104 may be embodied as a network, a set of networks, or another suitable networking form factor. Some, many, most, or all of the components of the hardware architecture 100 are configured to communicate using the LAN 104 to enable various computing algorithms, as disclosed herein.

The administrator terminal 106 may be embodied as a desktop computer, a laptop computer, a tablet computer, a wearable computer, a smartphone, or another suitable computing form factor. The administrator terminal 106 may run an application program (e.g., a browser application program) to administer the server 112, the NLP logic unit 114, the first logical unit 108, or the second logical unit 110 over the LAN 104.

The first logical unit 108 may be embodied as a data source, a server, a hardware server, a virtual server, a collection of servers, a cloud computing instance, a server instance, an application server, a processor, an application program, a code, a firmware code, an object code, a source code, a function, a software module, an object, an application programming interface (API), a representational state transfer (REST) API, a trained machine learning (ML)

model, an artificial neural network (ANN), a convolutional neural network (CNN), a recurrent neural network (RNN), a software engine (e.g., a task dedicated software logic that can be started, paused, or stopped), or another suitable logical form factor. For example, the server 112 may host the first logical unit 108, although this configuration is not required.

The second logical unit 110 may be embodied as a data source, a server, a hardware server, a virtual server, a collection of servers, a cloud computing instance, a server instance, an application server, a processor, an application program, a code, a firmware code, an object code, a source code, a function, a software module, an object, an API, a REST API, a trained ML model, an ANN, a CNN, an RNN, a software engine (e.g., a task dedicated software logic that can be started, paused, or stopped), or another suitable logical form factor. The second logical unit 110 may be embodied in a form factor identical to the first logical unit 108 or in a form factor not identical to the first logical unit 108. For example, the server 112 may host the second logical unit 110, although this configuration is not required.

The server 112 may be embodied as a hardware server, a virtual server, a collection of servers, a cloud computing instance, a server instance, an application server, or another suitable computing service form factor.

The NLP logic unit 114 may be embodied as a software engine (e.g., a task dedicated software logic that can be started, paused, or stopped), a data source, a server, a hardware server, a virtual server, a collection of servers, a cloud computing instance, a server instance, an application server, a trained ML model, an API, a REST API, a processor, an application program, a code, a firmware code, an object code, a source code, a function, a software module, an object, an ANN, a CNN, an RNN, or another suitable NLP form factor. For example, the server 112 may host the NLP logic unit 114, although this configuration is not required and the NLP logic unit 114 may be hosted somewhere else, whether accessible via the WAN 102 or the LAN 104.

The server 116 may be embodied as a hardware server, a virtual server, a collection of servers, a cloud computing instance, a server instance, a web server, or another suitable computing service form factor.

The database 118 may be embodied as a relational database, a NoSQL database, a graph database, an object database, an in-memory database, or another suitable database computing form factor. For example, the server 116 may host the database 118, although this configuration is not required and the database 118 may be hosted somewhere else, whether accessible via the WAN 102 or the LAN 104. The database 118 may store a set of records containing a set of presentation elements, such as texts, images, videos, sounds, graphics, logos, cascading style sheets (CSS), or other suitable presentation elements. In the set of records, the database 118 may also store a set of uniform resource locators (URLs) or other suitable address references that are associated with the presentation elements. Therefore, the server 116 is programmed to query the database 118 to retrieve the set of records containing the set of presentation elements and the set of URLs or other suitable address references as needed. As such, the server 116 may be programmed to serve the set of presentation elements (or copies thereof) to the computing terminal 124 pursuant to the set of URLs or other suitable address references, as disclosed herein.

The ID verification service 120 may be embodied as a server, a hardware server, a virtual server, a collection of servers, a cloud computing instance, a server instance, a web server, an application server, a database server, a database management system (DBMS), an authentication server, a relational database, a NoSQL database, a graph database, an object database, an in-memory database, an API, a REST API, a trained ML model, a processor, an application program, a code, a firmware code, an object code, a source code, a function, a software module, an object, a software engine (e.g., a task dedicated software logic that can be started, paused, or stopped), or another suitable ID verification computing form factor. The ID verification service 120 may receive, over the WAN 102, an identification number that is associated with an end-user of the computing terminal 124. For example, the identification number may correspond to an identification physical document, such as a passport, a driver's license, a school identification, a government benefit card, a government identification card, or another suitable identification physical document. The ID verification service 120 may communicate, over the WAN 102, with an external computing system (e.g., a government or a private data source) to validate the identification number. Alternatively, the ID verification serve 120 may itself be the governmental or private data source. If the identification number is verified, whether by the ID verification service 120 or the government or private data source, then the ID verification service 120 returns, over the WAN 102, a content (e.g., an alphanumeric string) confirming verification (e.g., an authorization code, a pass code) to the server 116. However, if the identification number is not verified, then the ID verification service 120 returns, over the WAN 102, a content (e.g., an alphanumeric string) indicating that verification has not been made to the server 116.

The set of data sources 122, which may be a set of third party data sources, may each be embodied as a processor, a server, a hardware server, a virtual server, a collection of servers, a cloud computing instance, a server instance, an application server, a database server, a DBMS, a database, a relational database, a NoSQL database, a graph database, an object database, an in-memory database, an API, a REST API, a trained ML model, an ANN, a CNN, an RNN, a processor, an application program, a code, a firmware code, an object code, a source code, a function, a software module, an object, a software engine (e.g., a task dedicated software logic that can be started, paused, or stopped), or another suitable data source computing form factor. The set of data sources 122 may be controlled by a set of entities that are separate and distinct from each other.

The computing terminal 124 may be embodied as a desktop computer, a laptop computer, a tablet computer, a wearable computer, a smartphone, or another suitable computing form factor. The computing terminal 124 may run an application program (e.g., a browser application program). The application program of the computing terminal 124 may be programmed to be authenticated to communicate with the server 112 or server 116, over the WAN 102, via a web token. The web token may employ a human-readable text to store and transmit a set of data objects. The set of data objects may include a set of attribute-value pairs. The set of attribute-value pairs may include a username/password, or a user identifier and a passcode or a private key. The set of attribute-value pairs may be input to the computing terminal 124 by an end-user of the computing terminal 124. The web token may be embodied as a JavaScript Object Notation (JSON) file or another suitable delimited file (e.g., CSV, XML).

The set of business rules 126 may each or collectively be embodied as a logical rule, a causal conditional, a workflow, a task, a procedural step, an information requirement, or another suitable rule form factor. The set of business rules 126 may form a set of specific logic or a set of conditions that controls a decision-making process. For example, each business rule of the set of business rules 126 may include a condition, an action, or an exception. For example, the condition of the business rule of the set of business rules 126 may define a set of parameters that must be met for a rule to be satisfied. For example, the action may be a task or step that is performed when the condition is satisfied. For example, the exception may define a set of special cases when the action should not be performed even if the condition is satisfied. The first logical unit 108 may apply the set of business rules 126 to at least some inputs received from the web form, as further described below.

The requirements optimization model 128 may be embodied as a mathematical model programmed to maximize or minimize an objective function without violating a set of constraints, a trained ML model, a software engine (e.g., a task dedicated software logic that can be started, paused, or stopped), an ANN, a CNN, an RNN, a classifier, a generative machine learning model, an optimization engine (e.g., a task dedicated software logic that can be started, paused, or stopped), or another suitable computer modeling form factor. For example, the requirements optimization model 128 may host the set of business rules 126 or the requirements optimization model 128 may be separate and distinct from the set of business rules 126. For example, the requirements optimization model 128 may receive at least some inputs of the web form from the server 112 over the LAN 104, as sent from the server 116, over the WAN 102. The requirements optimization model 128 may be programmed to evaluate that data to determine if that data satisfies a completion condition. In response, the requirements optimization model 128 outputs a reply including an identifier (e.g., a name of a data source to access) or a set of text strigs (e.g., a request for additional web form data) that may increase a likelihood of satisfying the completion condition, as further described below.

The set of business rules 130 may each or collectively be embodied as a logical rule, a causal conditional, a workflow, a task, a procedural step, an information requirement, or another suitable rule form factor. The set of business rules 130 may form a set of specific logic or a set of conditions that controls a decision-making process similar to the set of business rules 126. For example, each business rules of the business rules 130 may include a condition, an action, or an exception. For example, the condition of the business rule of the set of business rules 130 may define a set of parameters that must be met for a rule to be satisfied. For example, the action may be a task or step that is performed when the condition is satisfied. For example, the exception may define a set of special cases when the action should not be performed even if the condition is satisfied. The second logical unit 110 may apply the set of business rules 130 to at least some inputs received from the web form, as further described below.

The decision model 132 may be embodied as a trained ML model, a decision tree, an ANN, a CNN, an RNN, a classifier, a generative machine learning model, or another suitable computer modeling form factor. For example, the decision model 132 may host the set of business rules 130 or the decision model 132 may be separate and distinct from the set of business rules 130. The decision model 132 may receive at least some inputs of the web form from the server 112 and predict an expected outcome based thereon, such as a risk tier associated with those inputs. The decision model 132 is trained to decide whether those inputs satisfy an informational threshold. If those inputs satisfy the informational threshold, then the decision model 132 outputs a risk tier. The decision model 132 may determine whether the informational threshold is satisfied by evaluating those inputs one-by-one. In some situations, the decision model 132 may output a set of expected outcomes each with a confidence score or rating for each of such expected outcomes. For example, the decision model 132 may output a set of risk tiers and a confidence score or confidence level for each of such tiers. The server 112 may be operated by a first entity (e.g., an organization) with a first set of computing privileges (e.g., read, write, modify, delete) and the server 116 may be operated by a second entity (e.g., an organization) with a second set of computing privileges (e.g., read, write, modify, delete). The first entity may be different from the second entity and the first set of computing privileges may be different from the second set of computing privileges. For example, the first entity may be a first organization with a first set of users each having a first set of computing privileges, whether identical or non-identical to each other, and the second entity may be a second organization with a second set of users each having a second set of computing privileges, whether identical or non-identical to each other. Similarly, the ID verification service 120, the set of data sources 122, or the computing terminal 124 may be operated by a respective entity (or a set of respective entities) that is separate and distinct from the first entity or the second entity. For example, these differences may manifest by a set of computing privileges that are different from each other.

Figure 2A:
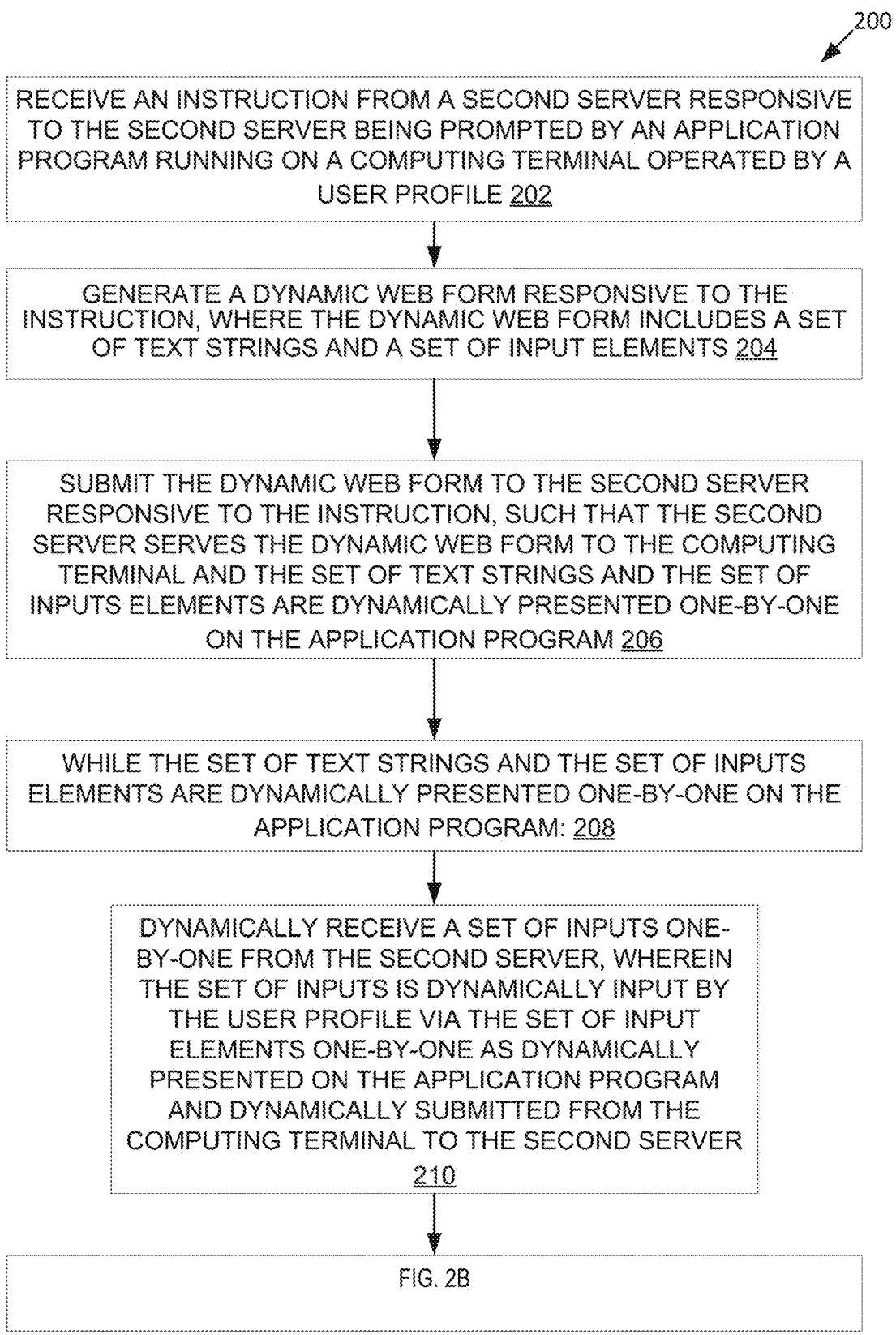

FIGS. 2A-2C shows a flowchart of an embodiment of a process of dynamically generating a web form according to this disclosure. In particular, there is a process 200 performed by the architecture 100. The process 200 is administrated by the administrator terminal 106 over the LAN 104. The process 200 includes a set of steps 202-220, some, many, most, or all of which may be performed by the server 112. For example, the server 112 may be a first server and the server 116 may be a second server. For example, the server 112 may run a software engine (e.g., a task dedicated software logic that can be started, paused, or stopped) to perform the set of steps 202-220.

In step 202, the server 112 (e.g., a software engine running thereon) receives an instruction (e.g., a message, a command) from the server 116, over the WAN 102, responsive to the server 116 being prompted, over the WAN 102, by the application program running on the computing terminal 124 operated by a user profile, which is controlled by a person operating the computing terminal 124. The server 116 generates the instruction responsive to the server 116 being prompted (e.g., requested) by the application program running on the computing terminal 124 to serve, over the WAN 102, a dynamic web form for rendering in the application program (e.g., a viewport) running on the computing terminal 124. For example, the dynamic web form may define a questionnaire (e.g., a reflexive questionnaire) to be completed by the person, where each question together with its corresponding answer may be dynamically displayed one-by-one (e.g., one at a time), as disclosed herein. Before, during, or after the server 116 is prompted, over the WAN 102, by the application program running on the computing terminal 124 to serve, over the WAN 102, the dynamic web form, the server 116 may query the ID verification service 120 to verify the user profile, as part of the dynamic web form or independent thereof. This verification may be based on a set of prompts presented to the application program running on the computing terminal 124 before, during, or after the server 116 is prompted, over the WAN 102, by the application program running on the computing terminal 124 to serve, over the WAN 102, the dynamic web form.

In step 204, the server 112 (e.g., a software engine running thereon) generates the dynamic web form responsive to the instruction, where the dynamic web form includes a set of text strings (e.g., a set of labels) and a set of input elements (e.g., a set of text fields, a set of dropdown menu). For example, the set of labels may be a set of questions and the set of input elements may elicit a set of answers to the set of questions, where each of such questions and corresponding answers may be dynamically displayed one-by-one (e.g., some are selectively shown and some are selectively not shown), as disclosed herein. For example, some of such answers may be structured (e.g., binary, dates) or freeform (e.g., a descriptive text, an unstructured text). The dynamic web form at this point in time may be a code (e.g., JavaScript) executable by the application program running on the computing terminal 124 to render the dynamic web form. For example, the server 112 creates an object to send as the dynamic web form using a programming language (e.g., JavaScript) to structure create the dynamic web form. For example, the server 112 may create a visual appearance using hypertext markup language (HTML), cascading style sheets (CSS), JavaScript, or another programming language. For example, the set of input elements may be defined in an HTML structure, such as a respective HTML tag for a text box, a radio button, a check box, such as "<input type="radio button"> to create a radio button selection for receiving a response to the set of text strings. For example, the dynamic web form may include client-side validation, which may be via the ID verification service 120, that verifies data input, such as valid email address input, dates, times, or other suitable inputs. For example, the dynamic web form may include server-side scripting that generates at least a portion of the dynamic web form dynamically in response to at least some inputs received from the set of input elements. For example, the dynamic web form may include a script (e.g., JavaScript) that dynamically presents different portions of the dynamic web form in response to different inputs with the application program running on the computing terminal 124, the server 116, or the server 112 selecting a next text string and a next input element for rendering based on what was input in a prior input element rendered with a prior input element. For example, the dynamic web form may include a form action which specifies a unified resource locator (URL) to which a set of data collected via the set of input elements will be sent from the application program running on the computing terminal 124 (e.g., the server 112, the server 116). The dynamic web form enables a one-by-one presentation on the application program running on the computing terminal 124, where each input (e.g., answer) is processed by the application program running on the computing terminal 124, the server 116, or the server 112 before the next text string and the next input element respectively is dynamically served, dynamically rendered, or dynamically displayed (e.g., some selectively shown and some selectively not shown).

In step 206, the server 112 (e.g., a software engine running thereon) submits the dynamic web form to the server 116, over the WAN 102, responsive to the instruction, such that the server 116 serves, over the WAN 102, the dynamic web form to the application program running on the computing terminal 124 and the set of text strings and the set of input elements are dynamically presented one-by-one on the application program running on the computing terminal 124. The server 116 may query the database 118 to retrieve a set of graphical data (e.g., images, logos, photos, videos) or other types of data (e.g., text, sound) for the dynamic web form and insert the set of graphical data or other types of data into the dynamic web to "dress up" or envelop the dynamic web form (e.g., for branding, white labeling) and then serve, over the WAN 102, the dynamic web form, as "dressed up," to the application program running on the computing terminal 124, such that the set of text strings and the set of input elements are dynamically presented one-by-one on the application program running on the computing terminal 124. The database 118 may be queried responsive to or while (i) the server 116 is being requested by the application program running on the computing terminal 124 to serve the dynamic web form, (ii) the instruction is being generated by the server 116, or (iii) the server 116 receiving the dynamic web form from the server 112. The server 112 may submit the dynamic web form to the server 116 by encoding the dynamic web form into an hypertext transfer protocol (HTTP) or a hypertext transfer protocol secure (HTTPS) message to transmit the dynamic web form to the server 116, over the WAN 102. The server 116 then serves, over the WAN 102, the dynamic web form (e.g., via HTTP/HTTPS) to the application program running on the computing terminal 124. Since the computing terminal 124 has a display and the application program running on the computing terminal 124 has a viewport, the application program running on the computing terminal 124 renders the dynamic web form for visualization in the viewport presented in the display such that the user profile, as controlled by the person operating the computing terminal 124, can interact with the dynamic web form.

In step 208, while the set of text strings and the set of input elements corresponding thereto are dynamically presented one-by-one (e.g., some selectively shown and some selectively not shown) on the application program running on the computing terminal 124, the server 112 (e.g., a software engine running thereon) performs a loop containing steps 210 to 218. While the steps 210-218 are described in a sequence to occur in sequence, this configuration is not required. For example, at least two of the steps 210 to 218 may be executed substantially concurrently, overlapping with each other, or in parallel, or at least two of the steps 210 to 218 may be executed in a reverse order, depending on functionality involved.

In step 210, the server 112 (e.g., a software engine running thereon) dynamically receives, over the WAN 102, a set of inputs one-by-one from the server 116. The set of inputs is dynamically input by the user profile, as controlled by the person, via the set of input elements one-by-one as dynamically presented on the application program running on the computing terminal 124 and dynamically submitted from the computing terminal to the server 112, such as by an API, a REST API, or another suitable approach. For each input in the set of inputs, the server 116 generates a completion status, an identifier of a data source to access, or a next text string (or next set of text strings) and a next input element (or a set of next input elements) to dynamically present on the application program running on the computing terminal 124.

In step 212, the server 112 (e.g., a software engine running thereon) dynamically selects a set of identifiers (e.g., URLs, logins) one-by-one for the set of third party data sources 122 storing a set of third party data collections (e.g., a set of personalized historical, demographic, or statistical data). This selection is based on dynamically evaluating the set of inputs one-by-one for relevance to the set of data collections, as disclosed herein, where each third party data collection in the set of third party data collections includes a set of third party data points (e.g., historical, demographic, or statistical personal information, historical, demographic, or statistical health information, historical, demographic, or statistical criminal information, historical, demographic, or statistical financial information) associated with the user profile. The set of third party data sources is different from each other in data organization (e.g., internal data organization) and latency (e.g., network responsiveness). The set of third party data collections are different from each other in content and format. The server 112 evaluates each data source for relevance to an input from the set of inputs receive and then selects an identifier of the set of identifiers associated with that data source that has a predetermined ratio (e.g., a cost value versus an estimated informational value to be extracted from a third party data collection). For example, this modality of operation may assist the server 112 in determining whether some third party data sources 122 need not to be queried, over the WAN 102, which saves computations, bandwidth, memory, and other technical attributes. For example, querying, over the WAN 102, one third party data source 122 may provide enough information to avoid querying another third party data source 122. Further, since this modality of operation occurs one-by-one, the server 112 is enabled to determine whether the server 112 needs to query or avoid querying some third party data sources 122, over the WAN 102, based on a threshold being satisfied for the requirement optimization model 128 and the set of business rules 126 that is performed for the user profile based on the set of questions already asked and the set of answers already received, where the requirement optimization model 128 and the set of business rules 126 is periodically pinged by the server 112, over the LAN 104, as the reflexive questionnaire is filled out to decide on whether the dynamic web form should ask another question, should query another third party data source 122, or is the dynamic web form completed.

In some embodiments, the set of inputs corresponds to the set of third party data collections in a one-to-one correspondence. For example, each data source in the set of data sources 122 may store a data collection, such as a set of personal, demographic, or statistical data. Each data collection includes a set data points (e.g., historical, demographic, or statistical personal information, historical, demographic, or statistical health information, historical, demographic, or statistical criminal information, historical, demographic, or statistical financial information) associated with the user profile. The set of third party data collections of the set of data sources may be different from each other in content and format. However, this configuration of different content and format is non-limiting and some data collections may include same or similar data points.

In some embodiments, two inputs into the web form may relate to one third party data source (e.g., one identifier for one third party data source). For example, a first input of indicating a date for a genus event (e.g., hospitalization) and a second input indicating a species event (e.g., a surgery operation) may relate to one third party data source that includes details of the species event occurring during the date for the genus event. In this case, only one third party data source needs to be accessed.

In step 214, the server 112 (e.g., a software engine running thereon) dynamically submits, over the WAN 102, a set of requests to the set of third-party data sources for the set of third party data collections one-by-one based on the set of identifiers, as determined previously. For example, such submission can be to satisfy the predetermined ration mentioned above. The server 116 requests to access or download one-by-one a set of copies (or subsets thereof) of the set of third-party data collections from the set of data sources 122.

In step 216, the server 112 (e.g., a software engine running thereon) dynamically receives, over the WAN 102, the set of third-party data collections (the set of copies or subset thereof) one-by-one from the set of third party data sources and a set of decryption certificates, where the set of third party data collections are encrypted to be decrypted by the set of decryption certificates on-demand. As described above, each of the data collections may have a different format, content, or encryption. The server 112 receives the set of data collections, over the WAN 102, in response to the set of requests submitted in step 214. The server 112 may decrypt, store, send to the server 116, or otherwise process the set of third party data collections one-by-one.

In step 218, the server 112 (e.g., a software engine running thereon) generates a response to the dynamic web form associated with the user profile based on the set of inputs and performs a holistic analysis of the set of third party data collections. The holistic analysis includes (a) ontologically (e.g., based on a medical ontology) identifying a subset of third party data points from the set of third party data points for each third party data collection in the set of third party data collections, (b) forming a set of copies of the subsets of third party data points, (c) submitting the set of copies into (i) the decision model 132, over the LAN 104, external to the software engine (or another form of suitable logic) running on the server 112, such that the decision model 132 generates a first decision based on the set of business rules 130, (ii) a rule model (e.g., the requirements optimization model 128), over the LAN 104, external to the software engine, such that the rule model generates a second decision independent of the first decision based on the set of business rules 126, and (iii) a set of logic (e.g., an application program, a software module, a subroutine), such that the set of logic generates the response based on the first decision and the second decision, where the response relates to the user profile. For example, the holistic analysis may involve a medical ontology segmented by Unified Medical Language System (UMLS) Concept Unique Identifiers (CUI) codes, where the medical ontology may be graph-based and relates to pharmacy codes.

Since the first decision may conflict with the second decision, the set logic resolves this conflict. The set of logic may be hosted by the server 112, the first logical unit 108, the second logical unit 110, or somewhere else, whether accessible via the WAN 102 or the LAN 104. For example, the response may be embodied as a tier from a set of tiers, a confidence level from a set of confidence levels, or another stratified form factor. For example, when some of the inputs received from the application program running on the computing terminal 124 are freeform text, the dynamic web form may query the NLP logic unit 114 to analyze in linguistic substance that freeform text and output a corresponding content as to what was meant by the freeform text and then ontologically map that corresponding content to a medical condition to trigger dependent logic or new questions when the dynamic web form is displayed. However, if the corresponding content cannot be mapped, then the corresponding content is ignored, flagged as not relevant, or deleted.

In step 220, the server 112 submits the response to the server 116, over the WAN 102, such that the server 116 serves the response to the application program running on the computing terminal 124 for consumption by the user profile responsive to the server 116 being prompted by the application program running on the computing terminal 124, pursuant to step 202.

Figure 3:
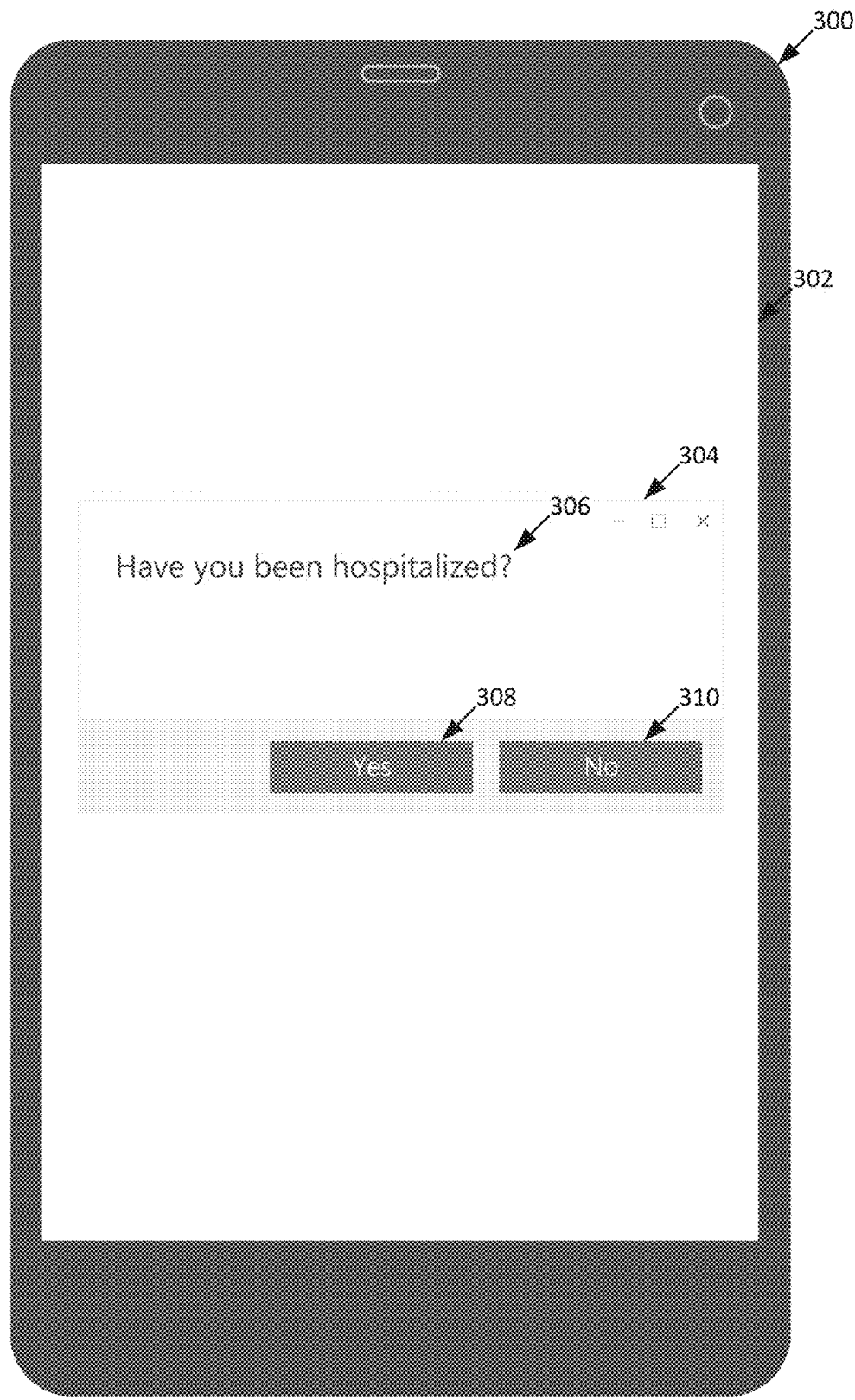
FIG. 3 shows a diagram of an embodiment of a computing terminal displaying a user interface according to this disclosure.

FIG. 3 shows a diagram of an embodiment of a computing terminal displaying a user interface according to this disclosure. In particular, there is a computing terminal 300, which may be embodied as the computing terminal 142. The computing terminal 300 includes a display 302 (e.g., a touchscreen) that displays a viewport of an application program (e.g., a browser application program) running on the computing terminal 300. The viewport depicts a portion of the dynamic web form 304, as disclosed herein, including a visible portion having a text string 306, a first input element 308 (e.g., a button although another suitable input element is possible), and a second input element 310 (e.g., a button although another suitable input element is possible) after the ID verification service 120 verified the user profile, as disclosed herein. The display 302 displays the text string 306, the first input element 308, and the second input element 310 in a one-by-one manner (e.g., one question and corresponding answer choices). As described above, the computing terminal 300 receives a user input based on the first input element 308 or the second input element 310 being activated through interaction via the display 302 (e.g., a virtual keyboard) through the user profile by the person operating the computing terminal 300. At that time, the computing terminal 300 communicates the input to the server 116 for forwarding the input to the server 112 for processing, as disclosed herein. For example, such processing may involve determining whether a particular third party data source 122 should or should not be queried based on information already known for that user profile, as disclosed herein.

Figure 4:
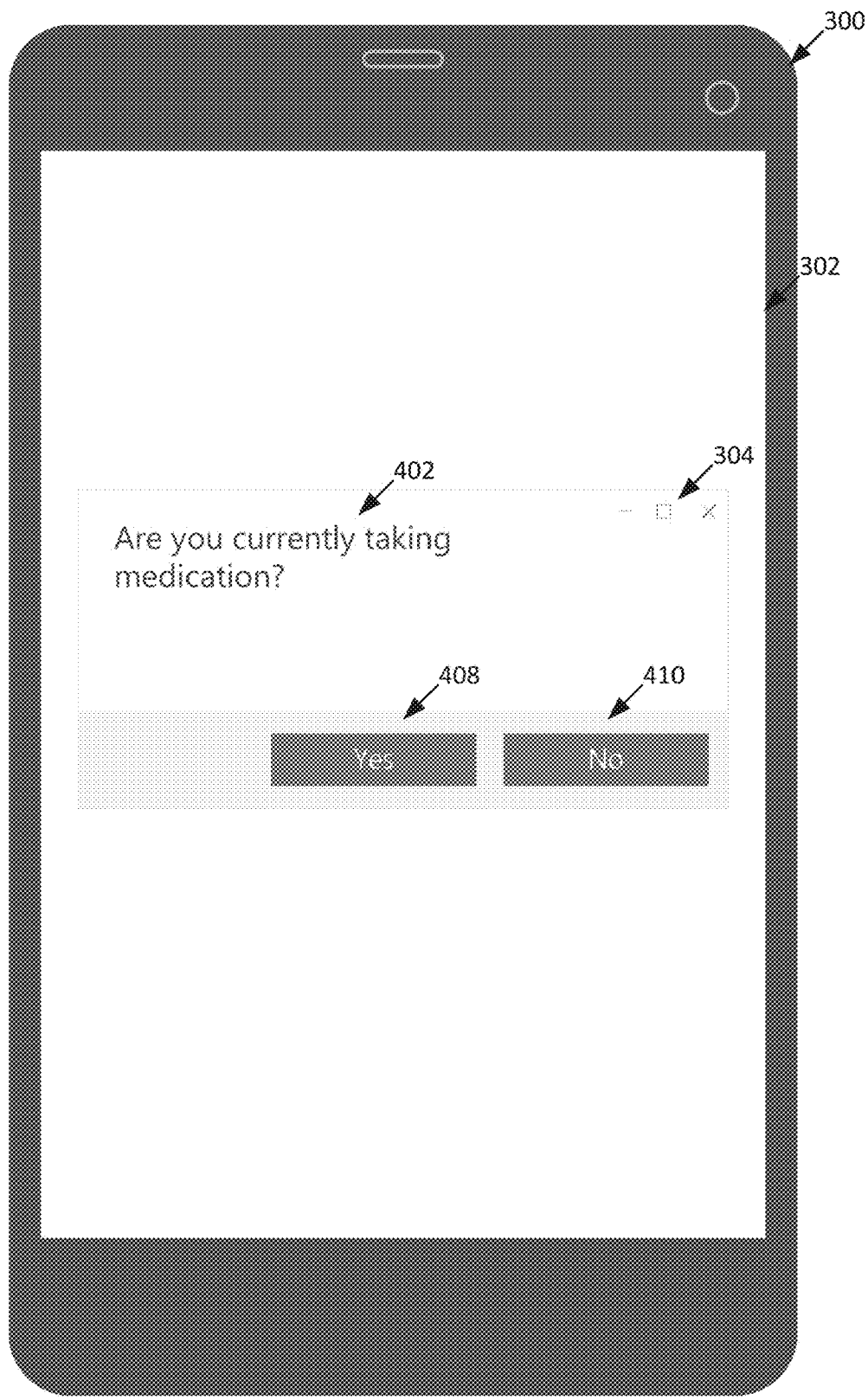
FIG. 4 shows a diagram of an embodiment of a computing terminal displaying a user interface according to this disclosure.

FIG. 4 shows a diagram of an embodiment of a computing terminal displaying a user interface according to this disclosure. In particular, continuing from FIG. 3, the display 302 displays the portion of the dynamic web form 304 including a text string 402, a first input element 408 (e.g., a button although another suitable input element is possible), and a second input element 410 (e.g., a button although another suitable input element is possible). The display 302 displays the text string 402, the first input element 408, and the second input element 410 in the one-by-one manner. As described above, the computing terminal 300 receives a user input based on the first input element 408 or the second input element 410 being activated through interaction via the display 302 (e.g., a virtual keyboard) through the user profile by the person operating the computing terminal 300. At that time, the computing terminal 300 communicates the input to the server 116 for forwarding the input to the server 112 for processing, as disclosed herein. For example, such processing may involve determining whether a particular third party data source 122 should or should not be queried based on information already known for that user profile, as disclosed herein.

Figure 5:
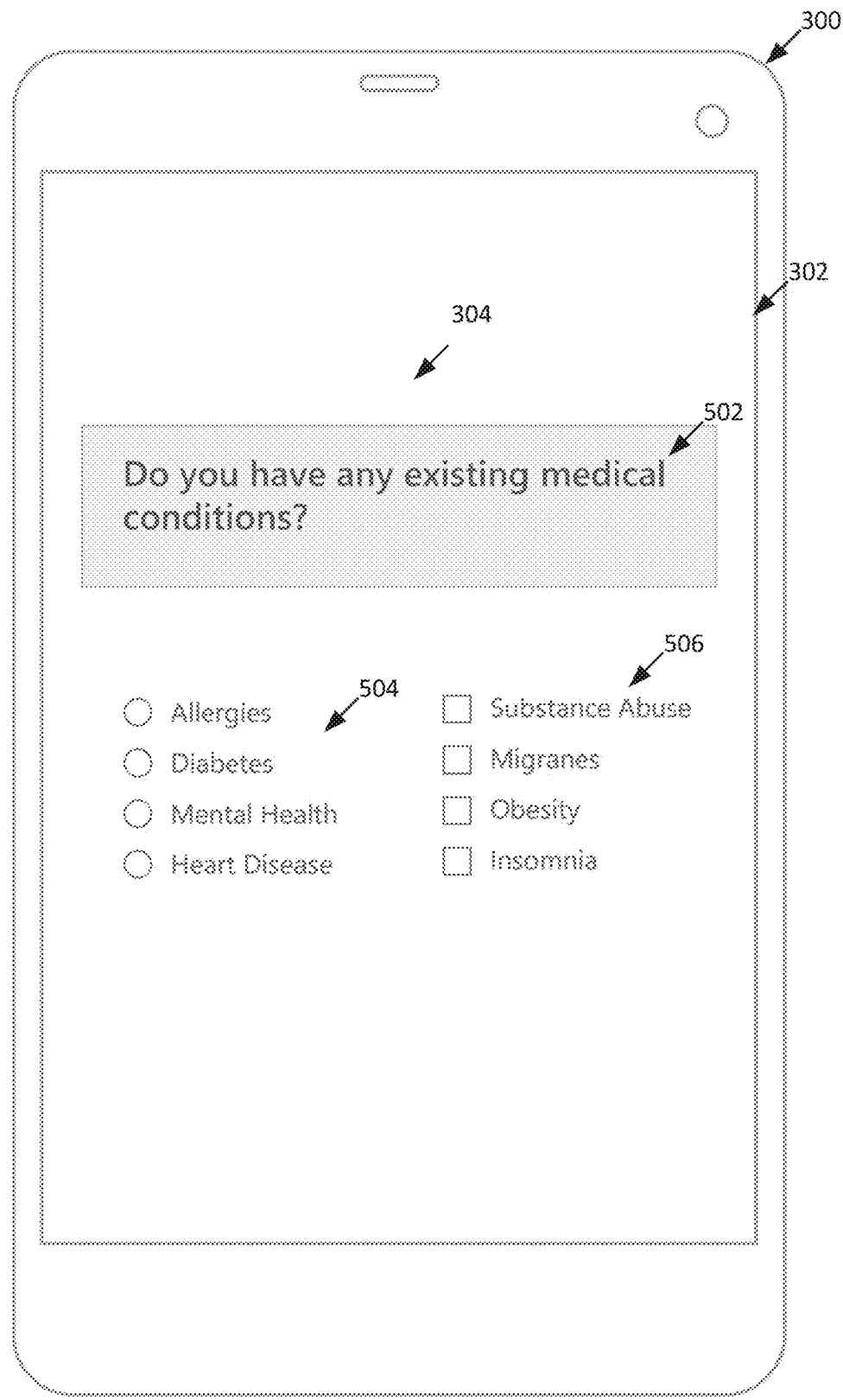
FIG. 5 shows a diagram of an embodiment of a computing terminal displaying multiple types of input elements according to this disclosure.

FIG. 5 shows a diagram of an embodiment of a computing terminal displaying multiple types of input elements according to this disclosure. In particular, continuing from FIG. 3 or 4, the display 302 displays the dynamic web form 304 including a text string 502, a first set of input elements 504, and a second set of input elements 506. The display 302 displays the text string 502, the first set of input elements 504, and the second set of input elements 506 in the one-by-one manner. As described above, the computing terminal 300 receives a set of user of inputs based on the first set of input elements 504 and the second input elements 506 being activated through interaction via the display 302 (e.g., a virtual keyboard) through the user profile by the person operating the computing terminal 300. At that time, the computing terminal 300 communicates the set of inputs to the server 116 for forwarding the set of inputs to the server 112 for processing, as disclosed herein. For example, such processing may involve determining whether a particular third party data source 122 should or should not be queried based on information already known for that profile, as disclosed herein. Note that unlike FIG. 3 or 4, this configuration allows for batching of the set of input elements, when the set of input elements is related to one common topic.

Figure 6:
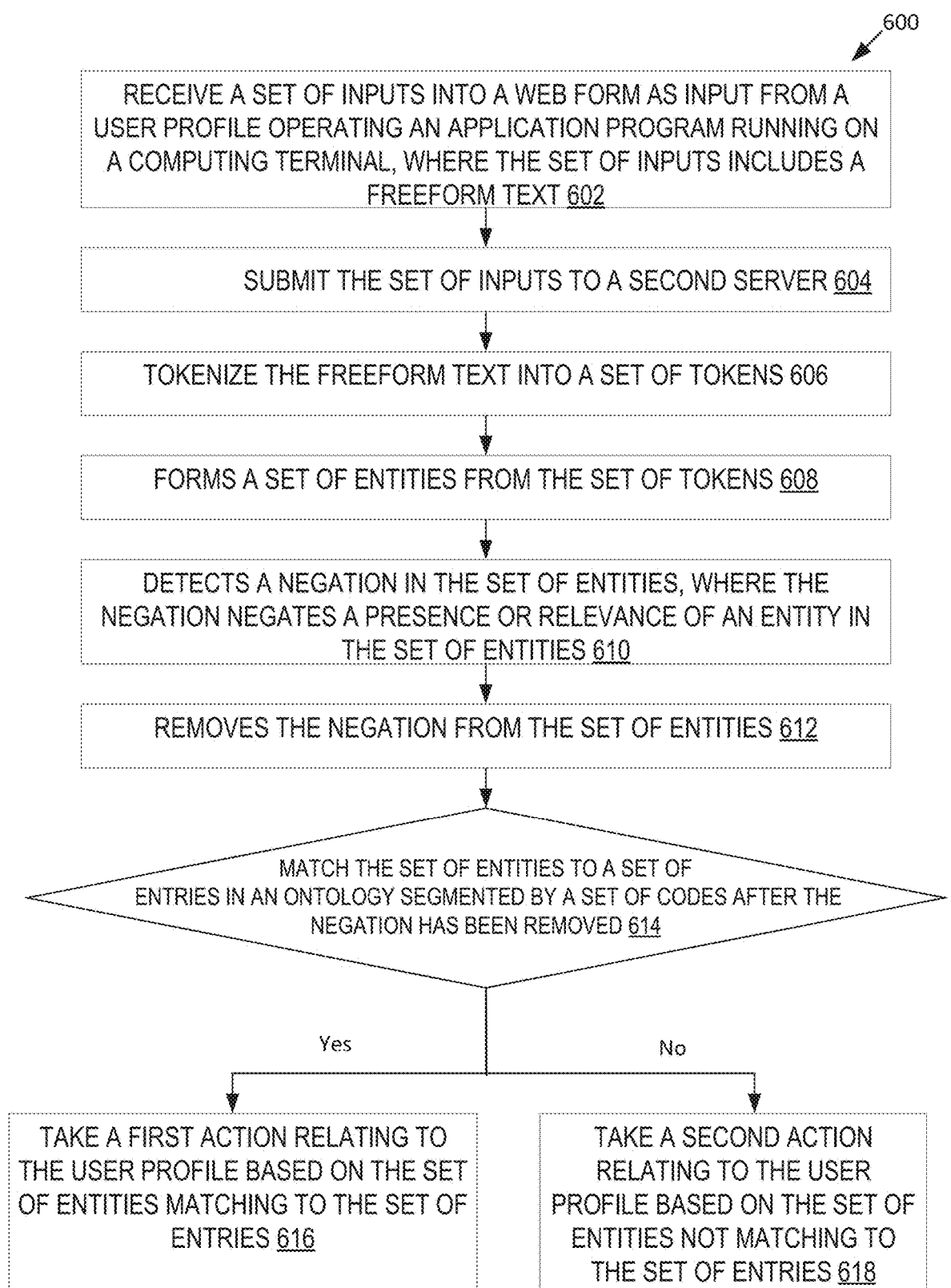
FIG. 6 shows a diagram of a flowchart illustrating a process of handling a freeform text response according to this disclosure.

FIG. 6 shows a diagram of a flowchart illustrating a process of handling a freeform text response according to this disclosure. In particular, there is a process 600 performed by the architecture 100, which may occur with or without the process 200 being performed. For example, the process 600 may be performed in the process 200 when at least some user inputs into the dynamic web form include a freeform text (e.g., a descriptive text, an unstructured text). The process 600 includes a set of steps 602-618, some, many, most, or all of which may be performed by the server 112. For example, the server 112 may be a first server and the server 116 may be a second server. The process 600 is administrated by the administrator terminal 106 over the LAN 104.

In step 602, the server 116 serves, over the WAN 102, a web form (e.g., dynamic, static) with a set of text strings (e.g., a set of labels) and a set of input elements (e.g., a checkbox, a radio button, a dropdown, a freeform text box) corresponding to the set of text strings to the application program running on the computing terminal 124, as requested, over the WAN 102, by the application program running on the computing terminal 124. Then, the server 116 receives, over the WAN 102, a set of inputs input via the set of input elements, as input via the user profile operating the application program running on the computing terminal 124 operated by the person. The user profile may be validated by the ID verification service before sending the set of inputs, as part of the web form or independent thereof. The set of inputs includes a freeform text (e.g., a descriptive text, an unstructured text), which may be input into a freeform text box.

The server 116 may serve, over the WAN 102, the web form with the set of text strings and the set of input elements to the application program running on the computing terminal 124 based on the server 116 querying the database 118 to retrieve a set of graphical data (e.g., images, logos, photos, videos) or other types of data (e.g., text, sound) for the web form and insert the set of graphical data or other types of data into the web form to "dress up" or envelop the web form (e.g., for branding, white labeling) and then serve, over the WAN 102, the web form, as "dressed up," to the application program running on the computing terminal 124, such that the set of text strings and the set of input elements are presented (e.g., dynamically, one-by-one) on the application program running on the computing terminal 124. The database 118 may be queried responsive to or while (i) the server 116 is being requested by the application program running on the computing terminal 124 to serve the web form or (ii) the server 116 receiving the web form from the server 112 if the web form is generated by the server 112, as disclosed herein.

In step 604, the server 116 submits (e.g., serves) the set of inputs to the server 112. Such submission may enable the server 112 to generate a response to the web form based on the set of inputs and serve the response to the server 116 for serving the response to the application program running on the computing terminal 124, as disclosed herein. For example, the response may be as the response in the process 200 when the process 600 is performed in the process 200, as disclosed herein.

In step 606, the server 112 requests the NLP logic unit 114 to lexically tokenize the freeform text into a set of lexical tokens. This lexical tokenization may be performed by a lexical tokenizer (e.g., a software module, a subroutine, a function, an engine (e.g., a task dedicated software logic that can be started, paused, or stopped), an API, a REST API) and involve segmenting the freeform text into a set of smaller linguistic elements, such as nouns, verbs, adjective, words, phrases, or other suitable linguistic elements. For example, such lexical tokenization may include applying a tag to each lexical token that identifies an entity, a part of speech, or a meaning of the token.

Before lexical tokenization of the freeform text into the set of lexical tokens, there may be a machine-translation logic (e.g., a machine-translation engine (e.g., a task dedicated software logic that can be started, paused, or stopped), a machine-translation API, a machine-translation REST API, a web page hosting a machine-translation interface) activated to translate the freeform text from a first language (e.g., Spanish) to a second language (e.g., English) if the freeform text is auto-detected by the server 116, the server 112, or the NLP logic unit 114 to be in the first language when received from the application program running on the computing terminal 124. The server 112 or the NLP logic unit 114 may host the machine-translation logic or the machine-translation logic may be hosted somewhere else, whether accessible via the WAN 102 or the LAN 104.

In step 608, the server 112 requests the NLP logic unit 114 to form a set of entities from the set of tokens. As described above, using the set of tokens (and optionally a set of tags) generated in step 606, the NLP logic unit 114 may form a set of entities from the set of lexical tokens to perform additional an analysis, such as matching tokens with a library, an ontology, a corpus of words, or a knowledge graph, as disclosed herein. For example, the set of entities may be formed by a named-entity-recognition (NER) process running on the server 112, which may be via the NLP logic unit 114.

In step 610, the server 112 requests the NLP logic unit 114 to detect a negation in the set of entities, where the negation negates a presence of relevance of an entity in the set of entities. For example, the negation may be "I do not have diabetes." As described above, the NLP logic unit 114 may detect a word with a negative connotation, such as the word "not" or "non" or "absent" or "lack" that negates an entity that is adjacent, such as "not hospitalized." There may be multiple negations detected in the set of entities. In an embodiment, the NLP logic unit 114 may detect the negation using sentence polarity detection, semantic analysis, or other suitable negation detection processes. Using sentence polarity detection, the NLP logic unit 114 determines whether the sentence (or portion of a sentence) expresses a positive or negative opinion. If the sentence polarity is negative, then the NLP logic unit 114 detects a negation for a subject of the sentence. If the sentence polarity is positive, then the NLP logic unit 114 does not detect a negation for a subject of the sentence. Alternatively, the NLP logic unit 114 may detect the negation using semantic analysis. Using semantic analysis, the NLP logic unit 114 determines whether a subject of a phrase expresses a positive or negative relationship. If the relationship is negative, then the NLP logic unit 114 detects a negation for the subject. If the relationship is positive, then the NLP logic unit 114 does not detect a negation for the subject.

In step 612, the server 112 requests the NLP logic unit 114 to remove (e.g., delete) the negation from the set of entities. As described above, after detecting negations, the NLP logic unit 114 removes those negations from the set of entities. Returning to the previous example, a resulting set of entities would not include "hospitalized." The NLP logic unit 114 outputs the resulting set of entities. In an example with multiple negations, the NLP logic unit 114 removes each negation from the set of entities.

In step 614, the server 112 accesses the resulting set of entities, post-negation, and attempts to match the resulting set of entities to a set of entries in an ontology (e.g., graph-based) segmented by a set of codes (e.g., alphanumeric) after at least some negations has been removed. As described above, the server 112 attempts to match each of these entities with entries in the ontology, such as the international classification of diseases (ICD) ontology or a current procedural terminology (CPT) ontology, any of which may be graph-based. In an embodiment, the server 112 may perform matching using string matching, fuzzy matching, or other suitable process for matching an entity to the ontology. For example, such matching may occur serially or in parallel. In response to the server 112 identifying a match between an entity in the resulting set of entities and an entry of the ontology, then step 616 is performed. If the server 112 is not able to identify the match between an entity in the resulting set of entities and an entry of the ontology, then step 618 is performed. This decision occurs for each entity on the set of resulting entities.

In step 616, the server 112 takes a first action relating to the user profile based on at least some, many, most, or all of the resulting set of entities respectively matching to at least some, many, most, or all of the set of entries in the ontology. For example, if the process occurs in the process 200, then the first action may include enabling the response to cause dynamically presenting more text strings of the set of text strings and more input elements of the set of inputs elements one-by-one on the application program running on the computing terminal 124 relating to the set of text strings and the set of inputs elements that were already dynamically presented one-by-one on the application program, as disclosed herein. In some embodiments, after step 616, the process 600 returns to block 602.

In step 618, the server 112 takes a second action relating to the user profile based on at least some, many, most, or all of the resulting set of entities not matching to at least some, many, most, or all of the set of entries. For example, the second action may include ignoring the resulting set of entities when generating the response for the server 116.

Figure 7:
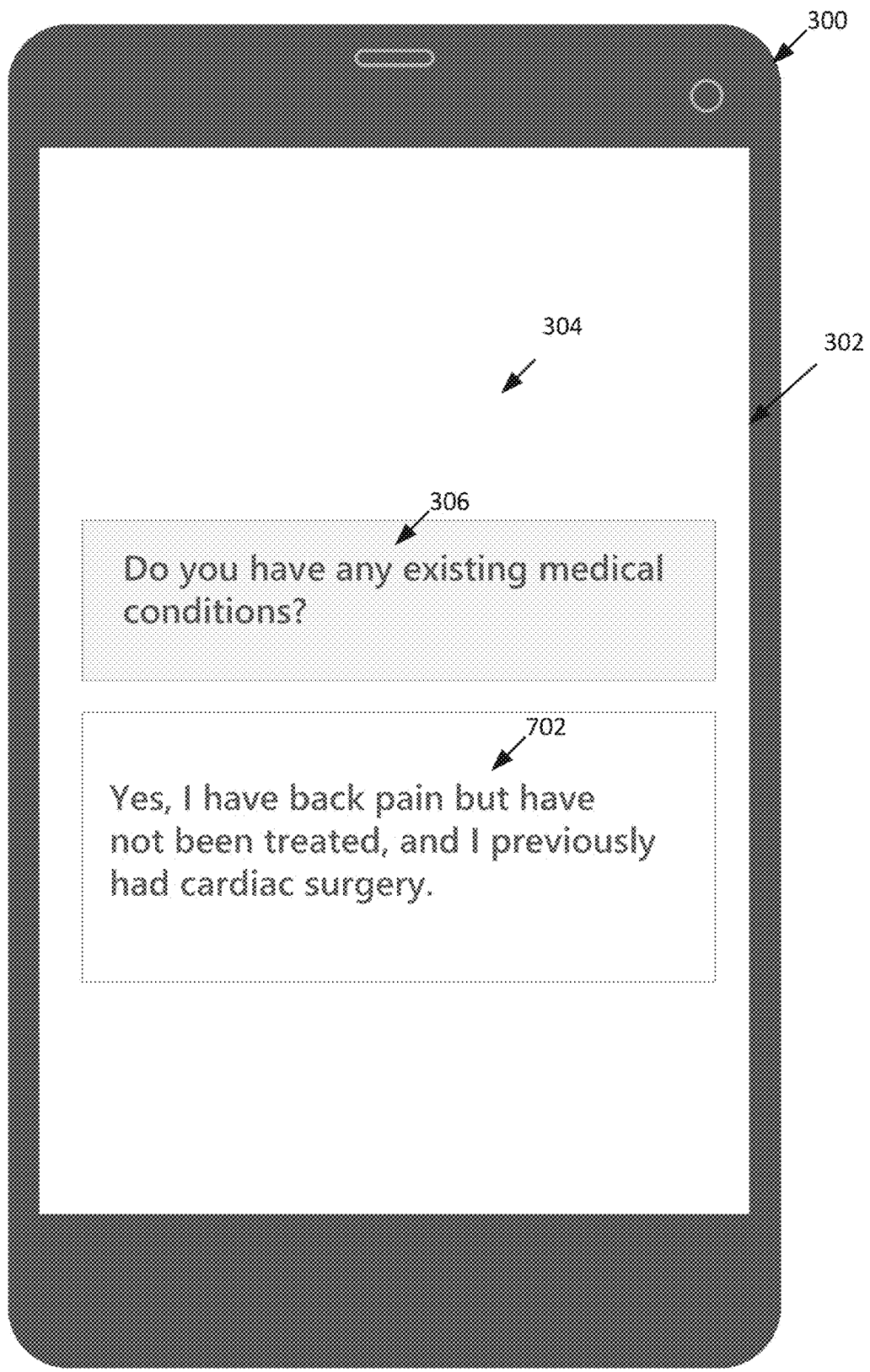
FIG. 7 shows a diagram of an embodiment of a computing terminal displaying a user interface with an input element for a freeform text according to this disclosure.

FIG. 7 shows a diagram of an embodiment of a computing terminal displaying a user interface with an input element for a freeform text according to this disclosure. In particular, continuing with the computing terminal 300 of FIGS. 3-5, the display 302 presents the portion of the dynamic web form 304 including the text string 306 and an input element 702 (e.g., a freeform text box) that enables an input of the freeform text by the user profile, as disclosed herein. The display 302 displays the text string 306 and the input element 702 in the one-by-one (e.g., one text string and one freeform text input element) manner, as disclosed herein. As described above, the computing terminal 300 receives the input of the freeform text based on the based on the input element 702 being activated through interaction via the display 302 (e.g., a virtual keyboard) through the user profile by the person operating the computing terminal 300. At that time, the computing terminal 300 communicates the input of the freeform text to the server 116 for forwarding the input of the freeform text to the server 112 for processing, as disclosed herein. For example, such processing may involve determining whether a particular third party data source 122 should or should not be queried based on information already known for that user profile, as disclosed herein.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although various embodiments have been depicted and described in detail herein, skilled artisans know that various modifications, additions, substitutions and the like can be made without departing from this disclosure. As such, these modifications, additions, substitutions and the like are considered to be within this disclosure.

What is claimed is:

1. A system, comprising:
   a first server programmed to:
      receive a set of inputs into a web form as input from a user profile operating an application program running on a computing terminal, wherein the set of inputs includes a freeform text;
      submit the set of inputs to a second server, such that the second server:
         tokenizes the freeform text into a set of tokens;
         forms a set of entities from the set of tokens;
         detects a negation in the set of entities, wherein the negation negates a presence or relevance of an entity in the set of entities;
         removes the negation from the set of entities;
         attempts to match the set of entities to a set of entries in an ontology segmented by a set of codes after the negation has been removed;
         takes a first action relating to the user profile based on the set of entities matching to the set of entries; and
         takes a second action relating to the user profile based on the set of entities not matching to the set of entries.

2. The system of claim 1, wherein the first action includes (i) generating a response to the web form associated with the user profile based on the set of inputs and a holistic analysis of a set of third party data collections downloaded by the second server responsive to evaluating the set of inputs, wherein each third party data collection in the set of third party data collections includes a set of third party data points associated with the user profile, wherein the set of third party data sources is different from each other in data organization and latency, wherein the set of third party data collections are different from each other in content and format, wherein the holistic analysis includes identifying a subset of data points from the set of data points for each third party data collection in the set of third party data collections based on the set of entities matching to the set of entries, forming a set of copies of the subsets of data points, submitting the set of copies into (i) a decision model external to the second server, such that the decision model generates a first decision, (ii) a rule model external to the second server, such that the rule model generates a second decision independent of the first decision, and (iii) a set of logic, such that the set of logic generates the response based on the first decision and the second decision, wherein the response relates to the user profile; and (ii) submitting the response to the first server, such that the first server serves the response to the application program for consumption by the user profile.

3. The system of claim 2, wherein the set of logic is a requirements optimization model.

4. The system of claim 2, wherein the set of inputs corresponds to the set of third party data collections in a one-to-one correspondence.

5. The system of claim 2, wherein at least two inputs of the set of inputs correspond to only one third party data collection of the set of third party data collections.

6. The system of claim 2, wherein the web form is a dynamic web form dynamically presenting a set of strings corresponding to a set of input elements programmed to receive the set of inputs, wherein the first action includes keep dynamically presenting more text strings of the set of text strings and more input elements of the set of inputs elements one-by-one on the application program relating to the set of text strings and the set of inputs elements that were already dynamically presented one-by-one on the application program.

7. The system of claim 2, wherein the ontology is a graph that is traversed when attempting to match the set of entities to the set of entries.

8. The system of claim 2, wherein the second action includes ignoring the set of entities when generating the response.

9. The system of claim 2, wherein the set of logic generates the response based on the first decision and the second decision when the first decision conflicts with the second decision.

10. The system of claim 2, wherein the second server hosts the set of logic.

11. The system of claim 2, wherein the response is a tier of a set of tiers or a confidence level of a set of confidence levels for the user profile.

12. The system of claim 2, wherein the second server identifies at least one third party data collection of the set of third party data collections to request for downloading based on dynamically evaluating the set of inputs one-by-one for relevance.

13. The system of claim 2, wherein dynamically evaluating the set of inputs one-by-one for relevance includes determining whether an informational threshold for the user profile is satisfied in context of a need to query another third party data collection of the set of third party data collections that was not already downloaded in view of at least one input of the set of inputs already dynamically evaluated for relevance, wherein the informational threshold is for each of the decision model and the set of logic.

14. The system of claim 2, wherein dynamically evaluating the set of inputs one-by-one for relevance is in view of a cost value versus an estimated value to be extracted from at least one third party data collection of the set of third party data collections.

15. The system of claim 2, wherein dynamically evaluating the set of inputs one-by-one for relevance is to determine whether another input of the set of inputs should be dynamically presented on the application program, whether another third party data collection of the set of third party data collection should be dynamically downloaded, or whether the set of inputs is informationally complete to generate the response.

16. The system of claim 2, wherein the second server is programmed to submit the response to the second server via a representational state transfer (REST) application programming interface (API).

17. The system of claim 1, wherein the first server is programmed to submit the web form to the second server via a representational state transfer (REST) application programming interface (API).

18. The system of claim 1, wherein the user profile is verified via the first server by the user profile operating the computing terminal to interface with the first server before the first server submits the set of inputs to the second server.

19. The system of claim 1, wherein the first server is operated by a first entity with a first set of computing privileges and the second server is operated by a second entity with a second set of computing privileges, wherein the first entity is different from the second entity, wherein the first set of computing privileges is different from the second set of computing privileges.

20. The system of claim 1, wherein the application program is authenticated to communicate with the first server via a web token employing a human-readable text to store and transmit a set of data objects including a set of attribute-value pairs, wherein the web token relates to the user profile.

21. A method, comprising:
 enabling a first server programmed to:
  receive a set of inputs into a web form as input from a user profile operating an application program running on a computing terminal, wherein the set of inputs includes a freeform text;
  submit the set of inputs to a second server, such that the second server:
   tokenizes the freeform text into a set of tokens;
   forms a set of entities from the set of tokens;
   detects a negation in the set of entities, wherein the negation negates a presence or relevance of an entity in the set of entities;
   removes the negation from the set of entities;
   attempts to match the set of entities to a set of entries in an ontology segmented by a set of codes after the negation has been removed;
   takes a first action relating to the user profile based on the set of entities matching to the set of entries; and
   takes a second action relating to the user profile based on the set of entities not matching to the set of entries.

\* \* \* \* \*